March 27, 1928. 1,664,038
L. B. McEWING
PROJECTION APPARATUS
Filed May 17, 1923 2 Sheets-Sheet 1
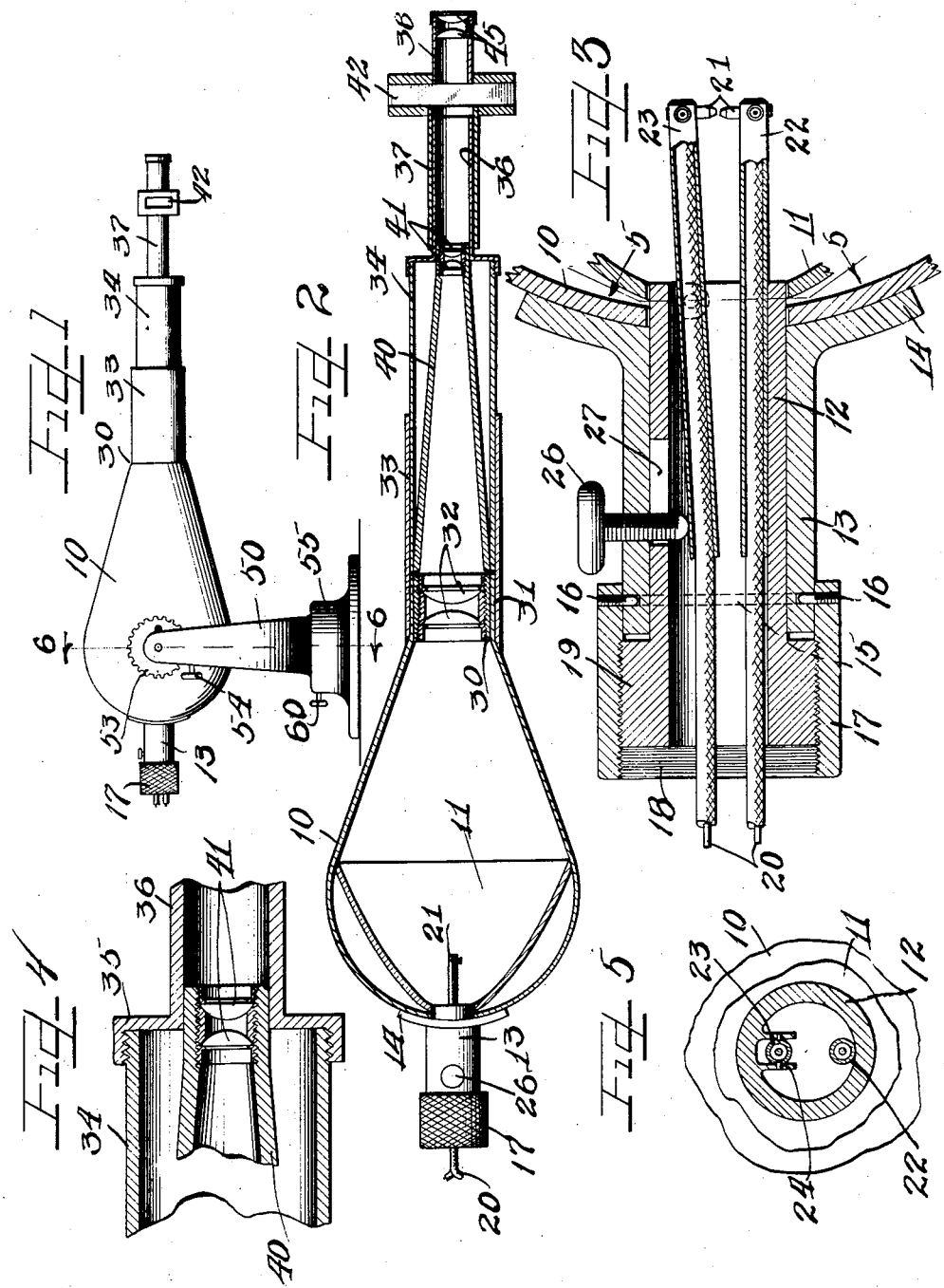

March 27, 1928.
L. B. McEWING
1,664,038
PROJECTION APPARATUS
Filed May 17, 1923
2 Sheets-Sheet 2
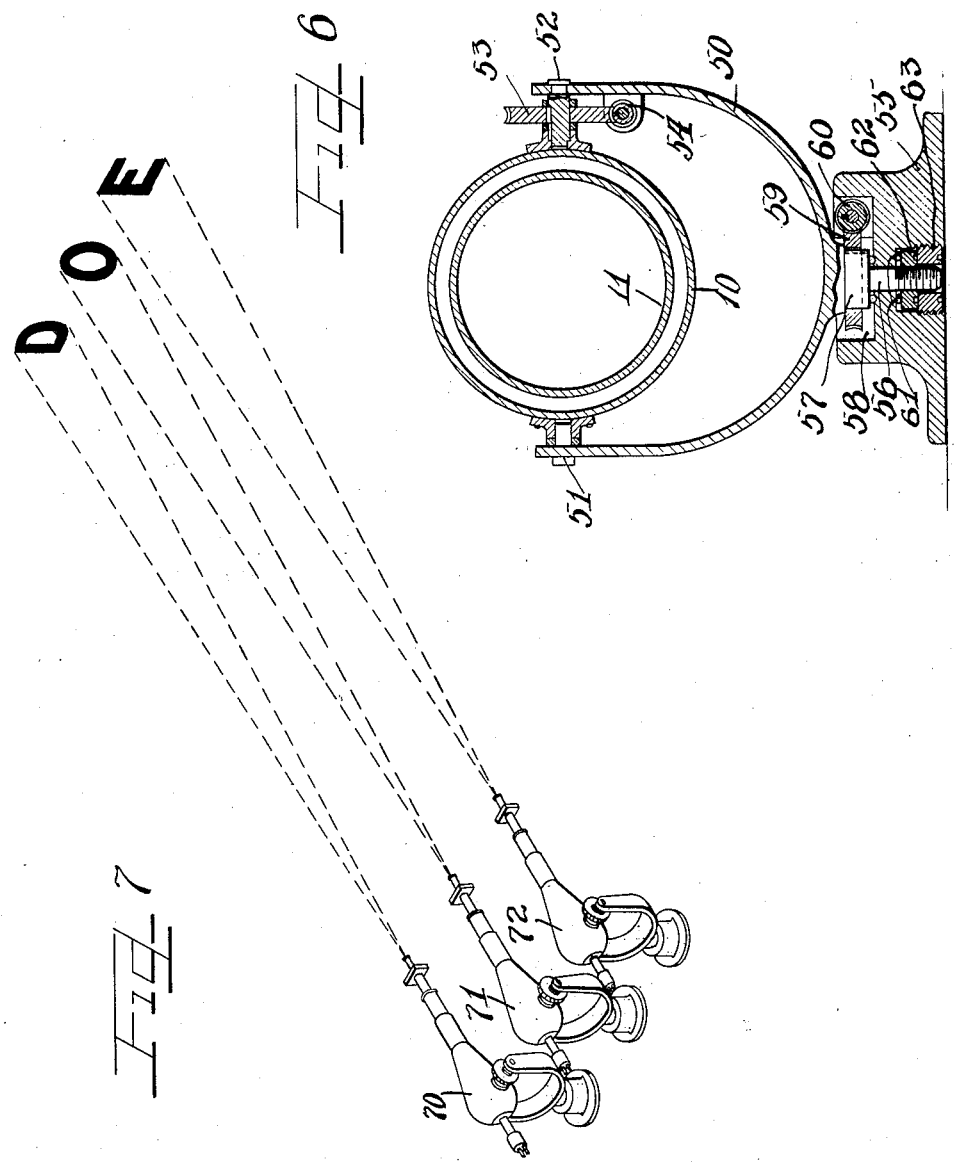
Witnesses
Robert E. Marks
James Celano
Inventor
Luther B. McEwing
by Charles H. Hills
Atty Patented Mar. 27, 1928.

1,664,038

UNITED STATES PATENT OFFICE.

LUTHER B. McEWING, OF CHICAGO, ILLINOIS.

PROJECTION APPARATUS.

Application filed May 17, 1923. Serial No. 639,504.

Heretofore in the problem of making optical projections for signalling, advertising, producing amusement, or other purposes, it has not been feasible to use the sky as a surface upon which to project because the projection apparatus, which is costly, could heretofore be used during only a small part of the time. It was only when there were clouds of sufficient size and density and favorably located that search light signals could be used. In signalling by means of searchlights this problem has not been of as gerat importance because such signalling is usually for war purposes where cost is a secondary consideration. Moreover, the signalling by searchlight depends upon the position or motion of a beam of light or upon the presence or absence of a mere illuminated patch in the sky. Of course, the patch can be used only when a cloud is present to receive the illumination and when the fog in the air is not too great to prevent making a bright spot of light upon a cloud at sufficient height.

For advertising purposes, a mere spot of light will not do because the public will not give attention to anything that must be first de-coded. To get an idea to the public, the illuminated spot must have some sort of pattern, either in the form of letters or of a trade-mark, or the like. Such a device must be right side up or the public will not readily recognize its significance.

It is an object of the present invention to devise a method whereby letters, words, trade-marks or other patterns having a significance which the public can recognize may be thrown upon the clouds or upon distant hills or cliffs or may be shifted from one surface to another or from one place to another on the same surface at will.

It is a further object of this invention to prepare a projecting apparatus by which the image may be rotated so as to place it right side up for the observer no matter in which direction the observers may be located and even when the projection is made near the zenith.

It is a further object of this invention to devise a projection apparatus which may be quickly and easily focused, quickly and readily adjusted to any given direction and which will remain steady and give an apparently stationary image as soon as adjustments are completed.

It is a further object of this invention to provide for moving the image readily when desired.

It is a further object of this invention to provide a means whereby the image projected by such an apparatus may be rotated so as to appear any side up that the operator selects.

It is a further object of this invention to provide simple and convenient means for adjusting and positioning the carbons of an arc lamp from the exterior of the projection apparatus.

Other and further important objects of this invention will be apparent from the disclosures in the specification and the accompanying drawings.

The invention (in a preferred form) is illustrated in the drawings and hereinafter more fully described.

On the drawings:

Figure 1 is a side view of the projection apparatus.

Figure 2 is a horizontal longitudinal section thereof.

Figure 3 is a vertical longitudinal section upon an enlarged scale through the arc lamp of said apparatus.

Figure 4 is a detail section upon an enlarged scale of one of the lens mountings.

Figure 5 is a section upon the line 5—5 of Figure 3.

Figure 6 is an enlarged section upon the line 6—6 of Figure 1.

Figure 7 is a diagrammatic view in perspective illustrating the use of a battery of projection apparatus.

As shown on the drawings:

The projection apparatus is of the general shape of a cannon having an enlarged breech 10 which contains a reflector 11 of a general parabolic shape. Through the apex of this reflector, which is at the rear end of the breech, goes a tube 12 which is held in alignment by a similar tube 13 secured to the breech 10 by a flange 14. The tube 13 is provided with a groove 15 for receiving the screws 16 that go through a cap 17, the outer surface of which is knurled. The inner surface of this cap is threaded as shown at 18 to co-operate with a threaded enlargement 19 upon the rear end of the tube 12. By rotating the cap 17, the tube 12 may be moved lengthwise of the tube 13.

The rear end of the cap 17 is open to admit two wires 20 for the purpose of feeding the arc lamp 21. The carbons of this arc lamp are secured in the forward ends of two tubes 22 and 23. The tube 22 is permanently secured in the tube 12 in any desired way. The tube 23 is pivotally mounted in the tube 12, as shown at 24 in Figure 5. A screw 26 extends through the wall of the tube 13 and through a slot 27 in the tube 12 to contact with the rear end of the tube 23. By rotating the screw 26 the rear end of the tube 23 may be depressed, causing the forward end to rise and so elongating the arc of the lamp 21; or, by rotating the screw 26 in the other direction, the arc may be shortened. The carbon holder and carbon in the forward end of the tube 23 are sufficient to overbalance the longer length of this tube at the rear of the pivot, so that no spring is needed to bias the carbons toward one another.

The rear end of the breech 10 is large and hemispherical in order to accommodate the reflector 11. From the edge of this reflector forward this breech tapers to the point 30, where the wall of the taper is continued as a cylinder 31 for housing a lens mounting. The condenser lenses 32 are secured in this lens mounting in the usual way. A tube 33 surrounds the cylinder 31 and holds a tube 34 in alignment with the cylinder 31. The tube 33 is long enough to insure that the alignment will be maintained although the tube 34 has an easy sliding fit in the tube 33.

At the forward end of the tube 34, a cap 35 is secured by a screw-threaded engagement. Integral with the cap 35 is a second tube 36 on the exterior of which is slidably mounted a tube 37. The tube 36 is made long enough to insure that the tube 37 will be in alignment with the rest of the optical system even though the sliding fit is easy, to enable focusing to be readily performed. Within the tube 34 is a conical tube 40, the forward end of which fits within the tube 36 and is supplied with a lens mounting.

The lenses 41 secured in this mounting are immediately at the rear of the housing 42. This housing is illustrated as having the usual horizontal slot into which a lantern slide, transparency, or a piece of cut sheet metal, or other device containing a pattern to be projected may be inserted. It is, however, evident that any other of the usual or desired ways of holding the pattern device in place may be used as readily as the slotted housing illustrated. On the forward side of this housing a tube 38 projects in line with the tube 37, so that the lenses 45 mounted in front of the housing 42 are at a fixed distance from the transparency.

The distance from the condenser lenses 32 to the reflector 11 is fixed, but except for this, the distance between the lenses 45 and the optical system. All of the rest of the distances are adjustable so that focusing is completely under the operator's control.

The projector is mounted in a stirrup 50 by means of a pair of pintles 51, 52, as shown in Figure 6. Upon one of these pintles is mounted a worm wheel 53, operated by a worm 54, for the purpose of controlling the elevation of the projector. The stirrup is supported in a pedestal 55 by means of a shaft 56. The upper part of this shaft has an enlargement 57 affording a seat for ball bearings between the enlargement 57 and the floor of the recess 58 in the top of the pedestal. This recess also houses a worm wheel 59 on said enlargement 57 and a worm 60 by means of which the projector may be turned about a vertical axis to control the azimuth.

Another recess 61 is provided in the pedestal 55 into which the shaft 56 projects. This recess contains a nut 62 screwed onto the shaft 56. Between the nut 62 and the top of the recess 61 anti-friction balls are provided. The nut 62 is intended to be screwed on the shaft 56 tight enough to draw both ball bearings into firm engagement so that vibration of the instrument will be prevented, but not tight enough to cause any excessive pressure upon the balls. Recesses are provided in the under side of the nut 62 to receive a spanner tool for performing the adjustment just described. After this adjustment is performed, the bottom of the recess 61 is closed by a screw plug 63, which is in threaded engagement not with the screw 56 but with the wall of the recess 61. If desired, the threads upon the wall of the recess may extend high enough for the plug 63 to act as a lock nut against the nut 62 and thus render the adjustment permanent.

In the use of the device, a lantern slide containing an advertisement, a letter, a picture, a trade-mark or any other design is introduced into the horizontal slot in the housing 42. Instead of a lantern slide, a pattern cut in sheet metal, a painted transparency or any other of the usual or suitable optical devices for giving a pattern may be used. The current is then turned on and the screw 26 manipulated until the points of the carbons 21 come into contact. The screw 26 is then further manipulated until the arc of the arc lamp is of the desired length. As the carbons waste away the arc can be maintained at the desired length by occasionally adjusting the screw 26.

The cap 17 is then turned until the arc 21 is at the focus of the reflector 11. This will also bring the arc into proper position relative to the condenser lenses 32. The tube 34 is then adjusted until the lens system 41 is at the correct distance from the lenses 32 to give to the projected image the lengthwise of the tube 46 until the projected image is sharp and clear. Tube 37 is then rotated about the tube 36 until the projected image is right side up.

The worms 54 and 60 are manipulated simultaneously or in turn until the image is brought into the desired position upon the surface against which the projection is being made. When this surface is the sky, it will be obvious that this adjustment must be changed from time to time in order that the image may fall upon a favorable part of the sky. Such an image is not very visible if it falls upon clear sky; it should be directed upon a cloud. When the cloud is moving, the image may be made to follow the motion by proper manipulation of the worms 54 and 60.

If the atmosphere is misty or foggy, particularly in brightly lighted cities, the image will hardly be seen except when thrown upon a dense cloud. When the atmosphere is clear, however, a light cloud will serve even in cities. Away from sources of extraneous illumination any clouds may be used except in the weather so foggy that the clouds cannot be seen. For example, when used at seaside resorts, by selecting a portion of the sky over the sea instead of over the land, the device can be almost always used. It is not necessary to wait for clouds to be in a particular spot.

In foggy weather the device can be used by directing the projection nearly horizontally at the locality where spectators are found. Such spectators, seeing the beam nearly "end-on", will perceive the pattern even though no surface is used to receive the projection.

As illustrated in Figure 7, instead of a single projector, a battery of projectors 70, 71, 72, may be used. This is of particular advantage when the only clouds available are small. In such a case, one part of the matter may be projected on one cloud and another part on a separate cloud, even though the second cloud be only very approximated in the right place. For example, if a word is to be spelled, each letter may be projected upon a separate cloud by this arrangement without being obliged to wait for the clouds to come into exact line. Also, this arrangement makes it possible to project an image upon the cloud and have one part of the image move relatively to another part. It will thus be possible to attract the attention of people who might otherwise ignore the image in the sky.

Many variations in the method of projecting and the method of using an assembled battery of projectors will occur to those skilled in the art, and I do not desire that the patent to be issued shall be limited to the specific steps described herein as my method.

I am also aware that many details of construction may be varied through a wide range without departing from the principles of this invention, and I therefore do not purpose limiting the patent granted otherwise than necessitated by the prior art.

I claim as my invention:

1. In a projection apparatus, a vertical rotatable shaft, a projection instrument mounted to rotate with said shaft, a pedestal in which said shaft is mounted, having a recess in its top, an enlargement on said shaft intermediate its length disposed in said recess in the top of said pedestal, a worm wheel on said enlargement, a worm in engagement therewith, a bottom recess in said pedestal into which said shaft projects, set and lock nuts in said lower recess for said shaft, and ball bearings between said enlargements and base and between said set nut and base.

2. In an optical instrument, a housing, a tube secured to said housing, a cap rotably mounted around a portion of said tube and confined against sliding movement, an interior tube slidable through said first tube into the housing and threadedly engaging said cap, whereby rotation of said cap will move said interior tube relative to said housing, and an illuminating means carried by and movable with said interior tube.

3. In a projection apparatus, an optical instrument, a casing supporting the instrument and having therein a light reflector and a source of light, a tubular support projecting from said casing, a tube carrying the source of light, said tube slidable through said support and having a screw-threaded outer end, a cap mounted on said support in threaded engagement with the tube, and a connection between said cap and said support permitting rotation of said cap but preventing longitudinal movement thereof, whereby rotation of the cap will shift said tube and the light source with respect to the casing.

4. In a projecting instrument, a source of light, a lens fixed with respect to the source of light, a second lens adjustable toward and from said first lens, a transparency housing in front of said second lens, said transparency housing being adjustable toward and away from the second lens and rotatable with respect thereto, and a third lens in front of said housing and supported in fixed relation thereto for adjustment therewith.

In testimony whereof I have hereunto subscribed my name.

LUTHER B. McEWING.